Jan. 2, 1951      E. BISHOP      2,536,531
FISH STRINGER
Filed June 22, 1949
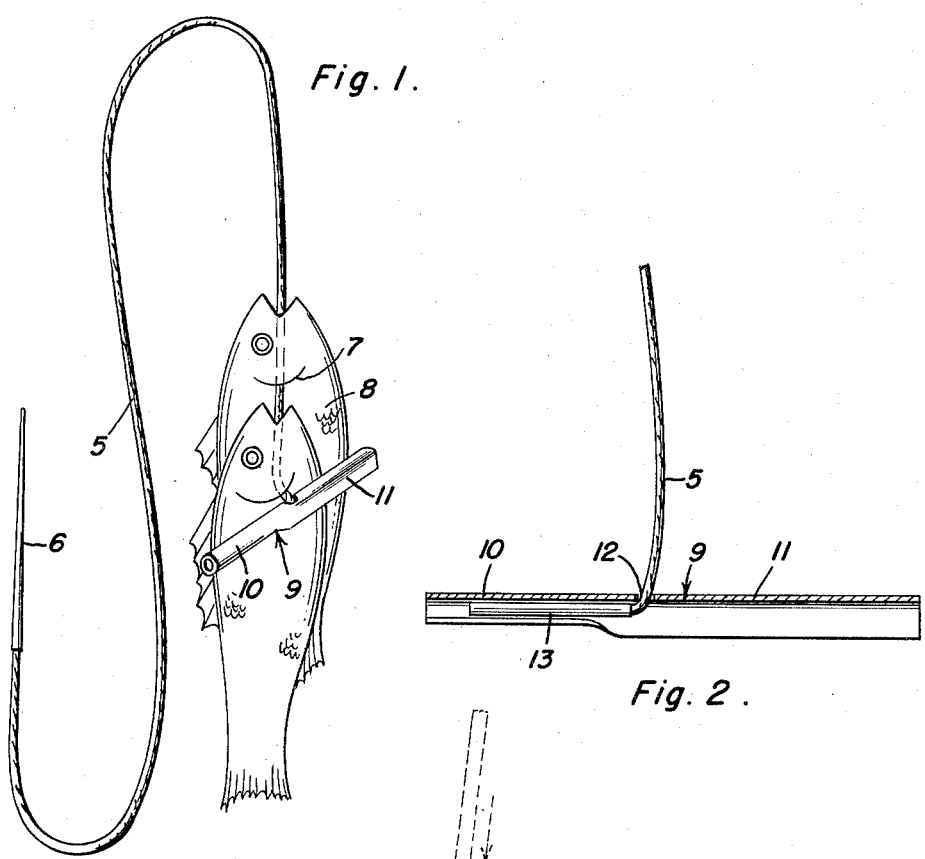
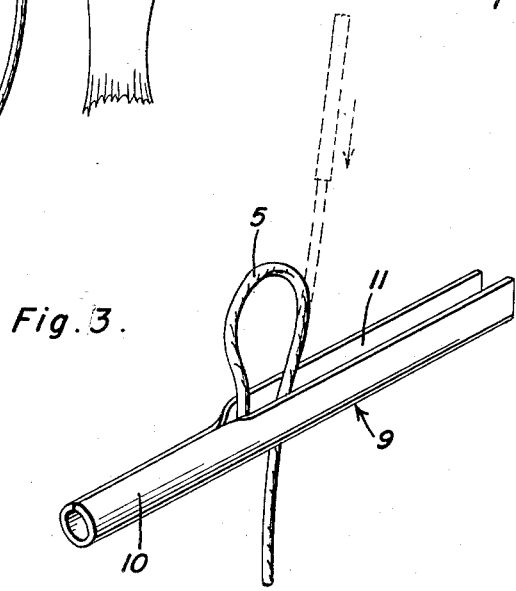
Ernest Bishop
INVENTOR.

Patented Jan. 2, 1951

2,536,531

UNITED STATES PATENT OFFICE 2,536,531

FISH STRINGER

Ernest Bishop, Jonesboro, La., assignor of one-half to Wayne Stovall, Jonesboro, La.

Application June 22, 1949, Serial No. 100,725

1 Claim. (Cl. 224—7)

The present invention relates to new and useful improvements in fish stringers having novel means whereby the fish may be conveniently removed when desired.

An important object of the invention is to provide a novel cross bar construction at the inner or lower end of a fish stringer and to which the fish stringer is easily and quickly secured for detaching the cross bar to facilitate removal of the fish without necessitating the removal of the fish in a reverse order from which they are placed on the stringer.

A still further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is an enlarged longitudinal sectional view of the cross bar; and

Figure 3 is an enlarged perspective view of the cross bar illustrating the manner of removal of the flexible element of the stringer therefrom.

Referring now to the drawings in detail wherein for the purpose of illustration I have disclosed a preferred embodiment of the invention the numeral 5 designates a cord or other flexible element having a needle 6 suitably secured to one end of the cord for threading the cord or line through the gills 7 of fish 8 for stringing on the cord in the usual manner.

The fish are held at the inner or lower end of the cord 5 by means of a cross bar 9 preferably constructed of sheet metal and rolled at one end to form a tube 10 and shaped at its other end to form a channel 11. An opening 12 is formed in the base or bottom of channel 11 in the region of its junction with tube 10 and through which the cord or flexible element 5 is inserted.

The inner or lower end of cord or flexible element 5 is provided with a rigid pin 13 of suitable diameter for also inserting in opening 12 for positioning the pin in tube 10 in the manner as shown in Figure 2 of the drawings.

In the operation of the device the pin 13 is inserted through opening 12 of cross bar 9 and the pin is then inserted into the inner end of tube 10 to anchor the pin therein in the position as shown in Figure 2 of the drawings. Fish may then be strung on the line 5, the cross bar 9 at the inner or lower end of the cord or string holding the fish thereon.

When it is desired to remove the fish the same are backed slightly on the cord or line 5 and the cord or string 5 pulled partly through opening 12 in the manner shown by the full lines in Figure 3 of the drawings sufficiently to enable pin 13 to be withdrawn from the inner end of tube 10 into the position shown by the dotted lines in Figure 3 and whereupon the cross bar 9 may be removed from the cord or line 5 as well as from the pin 13.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A fish stringer comprising a flexible member, a cross bar having an opening receiving one end of the flexible member, a tube at one end of the cross bar and a channel at the other end of said cross bar, and a locking pin fixed at one end on said end of the flexible member and removable therewith through the opening and removably positioned longitudinally in said tube.

ERNEST BISHOP.

REFERENCES CITED

The following references are of record in the file of this patent:

UNITED STATES PATENTS

| Number | Name | Date |
|---|---|---|
| 1,417,759 | McNiece | May 30, 1922 |
| 1,423,203 | Fiske | July 18, 1922 |
| 2,442,472 | Sagan | June 1, 1948 |